Oct. 19, 1937. V. E. MINICH Re. 20,538

ABRASIVE THROWING MACHINE

Original Filed May 26, 1934 3 Sheets-Sheet 1

INVENTOR
Verne E. Minich
BY
Austin & Fox
ATTORNEYS

Oct. 19, 1937. V. E. MINICH Re. 20,538

ABRASIVE THROWING MACHINE

Original Filed May 26, 1934 3 Sheets-Sheet 2

INVENTOR
Verne E. Minich
BY
Austin & Dix
ATTORNEYS

Oct. 19, 1937. V. E. MINICH Re. 20,538

ABRASIVE THROWING MACHINE

Original Filed May 26, 1934 3 Sheets-Sheet 3

INVENTOR
Verne E. Minich
BY
Austin & Dix
ATTORNEYS

Reissued Oct. 19, 1937

Re. 20,538

UNITED STATES PATENT OFFICE 20,538

ABRASIVE THROWING MACHINE

Verne E. Minich, Scarsdale, N. Y., assignor to The American Foundry Equipment Company, Mishawaka, Ind., a corporation of Delaware Original No. 2,077,637, dated April 20, 1937, Serial No. 727,665, May 26, 1934. Renewed January 25, 1937. Application for reissue August 17, 1937, Serial No. 159,586

14 Claims. (Cl. 51—9)

This invention relates to abrasive throwing machines and more particularly to a method and apparatus for throwing abrasive at a blasting velocity so as to effectively clean metal sheets, castings, forgings and the like.

According to this invention the machine is so arranged and constructed as to throw the abrasive fed into the machine at a blasting velocity under directional control. The machine generally comprises a wheel or rotor having a plurality of throwing blades extending from the periphery of the wheel inwardly short of the axis of rotation of the wheel. The blades may be rotatably supported from either one or a pair of spaced side wall members or discs fixed to a rotatable shaft. The blades are removable and replaceable through the wheel periphery, suitable means being provided to releasably retain the blades in fixed operative position. The abrasive is fed into the path of the rotating blades through one or more discharge openings provided in a control member which is adjustably mounted to direct the abrasive thrown from the machine in the desired direction. The control member preferably comprises a tube positioned centrally of the rotor and mounted independently thereof. An impeller positioned within the control member and preferably attached to the rotor for rotation therewith throws the abrasive through the discharge opening in the control member and into the path of the rotating vanes of the rotor. The impeller generally comprises a plurality of radially arranged vanes or blades carried by the rotatable disc of the rotor. The abrasive is fed through a suitable feed pipe into the impeller and the vanes of the impeller pick up the abrasive and carry the abrasive to the discharge opening in the control member through which it is thrown into the path of the rotating blades.

The abrasive can be fed into the path of the rotating blades at any desired point by adjusting the position of the discharge opening in the control member. Directional control is thus accomplished. The discharge opening is preferably of such form that the abrasive is discharged uniformly through the entire area of the discharge opening. The length of the path of thrown abrasive is determined and controlled by the circumferential length of the discharge opening. Triangular, offset rectangular and obliquely extending slot shaped discharge openings have proven to be practical and efficient but other shaped slots may be used to obtain the desired result. Two or more separated surfaces can also be cleaned simultaneously by providing two or more properly arranged openings in the control member. The control member is preferably constructed and mounted so that it can be easily removed and replaced if desired by a control member having an opening or openings of different size or shape. The same machine can thus be used for a variety of different operating conditions.

An object of this invention is to provide an abrasive throwing machine provided with adjustable means by which abrasive may be directionally controlled so as to do useful work.

Another object of this invention is to provide an abrasive throwing wheel having adjustable and replaceable parts by means of which the direction of flight and the area or areas covering the thrown abrasive may be regulated and controlled and whereby substantial uniform impingement of the abrasive against the article treated may be attained.

Another object of this invention is to provide a method for throwing abrasive at a blasting velocity and for controlling the direction of flight of and the area covered by the thrown abrasive.

Another object of this invention is to provide an abrasive throwing machine having associated parts which may be removed and replaced when worn or injured.

Another object of this invention is to provide an abrasive throwing machine which is simple in construction, inexpensive to manufacture and produce, which has a low power consumption for the work done, which imparts to the abrasive particles a highly effective abrading velocity, which causes a minimum disintegration of the abrasive particles, which is durable and lasting in construction, which is not subjected to excessive wear from the abrasive when thrown from the machine, which is provided with means for controlling the directional flight and the area covered by the thrown abrasive, and which is high adaptable for the cleaning of metal sheets, billets, shapes, forgings, castings, metal parts and other articles.

Other objects of this invention will become apparent as the disclosure proceeds.

In order that a clearer understanding of my invention may be had, attention is hereby directed to the accompanying drawings forming a part of this application and illustrating certain possible embodiments of my invention:

Referring to the drawings.

Similar reference characters refer to similar parts throughout the several views of the drawings and specification.

Figure 1:
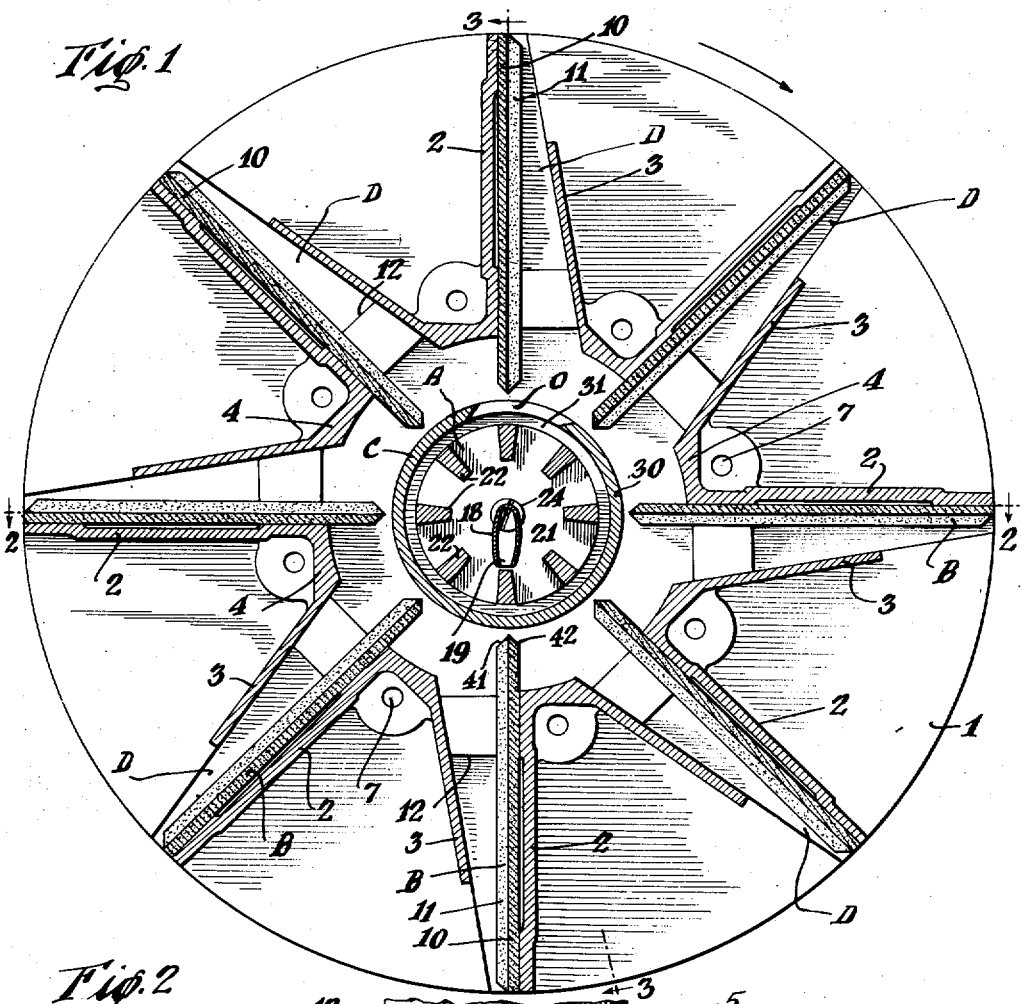
Fig. 1 is a longitudinal cross sectional view taken through the abrasive machine showing the interior construction thereof, this view being taken on line 1—1 of Fig. 2.

One of the big difficulties heretofore encountered in the operation of abrasive throwing wheels results from lack of control over the abrasive thrown therefrom. When the wheel or rotor is operated at a speed of 1800 revolutions per minute and upward, the rotor has a tendency to carry a portion of the abrasive around with it and throw the abrasive off into space where it fails to impinge the work if the abrasive is not brought under proper directional control before it is thrown. A heavy loss in efficiency thus results, and even more important, particles thrown at random soon destroy and abrade away operating parts of the machine or any protective guard placed around the machine. This invention contemplates provision of means for placing the thrown abrasive under control so that all abrasive particles may be directed and controlled so as to directly impinge the work with substantially uniform impingement intensity.

According to this invention abrasive particles, such as sand, steel, filings or shot are fed into an impeller A positioned within a control member C centrally mounted within a wheel or rotor. The rotor is mounted upon a rotatable shaft 5 having a hub 6 connected by means of the bolts 7 to a side wall member or disc 1. Abrasive throwing blades B are provided which are radially arranged in spaced relationship and extend from the periphery of the wheel inwardly short of the axis of rotation of the wheel so as to provide a central opening. The blades may be suitably supported from the side wall member or disc 1 or if desired the blades may be suspended between a pair of spaced side wall members 1 and 15. When a pair of side wall discs 1 and 15 are provided they may be held in fixed spaced relationship by means of suitable connecting vanes 2 which may also provide a support for the blades B. A guard vane 3 following the connecting vane may be provided, both vanes being joined together by an apex portion 4.

Directional control of the abrasive is accomplished through the provision of the control member C which is positioned centrally of the rotor and is independently and adjustably mounted with respect thereto. The control member C comprises generally a tubular wall 30 provided with an inturned flange 31 at the inner end thereof. The outer end of the tubular side wall 30 extends outside of the rotor and is provided with an out-turned flange 32. A supporting collar 33 surrounds the outer end of the tubular side wall 30 and is so shaped and arranged as to permit rotation of the control member with respect thereto. The supporting collar 33 may be angle shaped in cross section, as shown, or any other suitable shape. The collar member 33 is connected by means of bolts 39 to a supporting plate 40 extending from the framework which supports the machine. A pair of handles 38, suitably connected to the tubular side wall 30 of the control member, may be provided for adjusting the control member with respect to the rotor.

Figure 4:
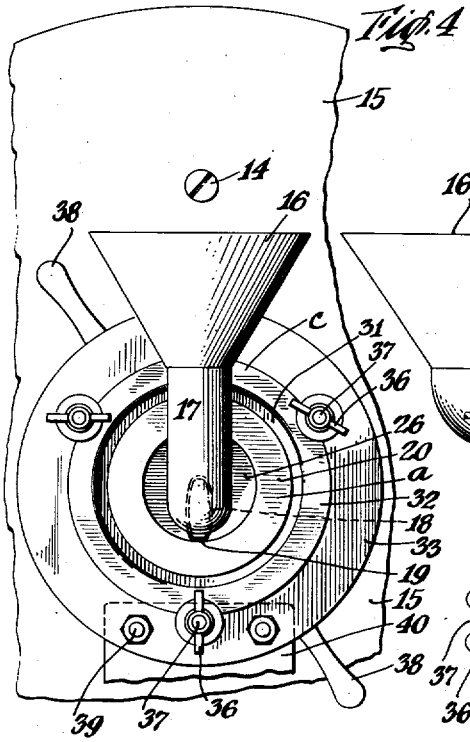
Fig. 4 is a fragmentary end view of the machine illustrating particularly one means which may be used to manipulate and hold the control member in any desired operating position.

Suitable means are provided for locking the control member in any desired adjusted position. As shown more particularly in Figs. 3 and 4, a plurality of key bolts 34 are provided which are hinged to lugs 35 extending from the supporting collar 33. Threaded wing nuts 36 which screw over threaded end portions 37 of the key bolts 34 seat over the out-turned flange 32 of the control member. By manipulating the wing nuts 36 the control member may be locked in any desired position. The control member C may be adjusted in position by simply loosening the wing nuts 36 and rotating the control member into the desired adjusted position. The control member is provided with a discharge opening O through which the abrasive fed into the machine is discharged into the path of the throwing blades B. The shape and arrangement of the discharge opening O will be discussed more fully hereinafter in connection with the operation of the machine.

Means are provided for propelling the abrasive fed into the control chamber into the path of the throwing blades through the discharge opening O. An impeller A positioned within the control member C rotates with the rotor. As shown more particularly in Figs. 1 and 3, the impeller comprises spaced plates 20 and 21 connected by the radially arranged throwing vanes and blades 22. The impeller is operatively connected to the rotor of the machine by means of a screw bolt 24 which extends through the plate 21 and screws into a plate 23 fixed to the disc 1 of the rotor by means of screws 25. It is understood, however, that the impeller can be connected to the rotor by other convenient means or it may be driven independently. The impeller should be so connected, however, as to permit removal of the control member when desired. Removal of the control member may be effected in the assembly herein shown by removing the screw bolt 24 which permits removal of the impeller A along with the control member C.

The abrasive is fed into a hopper or funnel 16 from which it passes into a suitable feed pipe 17. Plate 20 of the impeller is provided with a large opening 26 through which the feed pipe 17 extends. The discharge end 18 of the feed pipe 17 may be contracted into the general shape shown in Figs. 1, 3 and 4 and the discharge opening 19 therein is elongated so as to distribute the abrasive emitted therefrom substantially uniformly across the entire width of the throwing vanes 22. It will also be noted that the inner end of the feed pipe 17 is of generally elbow formation so as to direct the abrasive radially across the impeller vanes 22 and out of wearing contact with the impeller plates 20 and 21.

In operating the machine a supply of abrasive is fed into the hopper or funnel 16 from which it is fed in controlled amounts through the feed pipe 17. The abrasive is emitted from the discharge opening 19 of the feed pipe and is immediately picked up and carried by the throwing vanes 22 of the impeller until the discharge opening O is reached. The abrasive then escapes through the opening O.

The shape as well as the position of the discharge opening O in the control member C determines to a large extent the length of the path swept by the abrasive discharged from the machine as well as the uniformity of the discharge. A triangular shaped opening O, shown more particularly in Fig. 2, has been found to effectively control the direction and uniformity of the abrasive discharge. The apex of the triangular opening is positioned approximately centrally over the impeller A and the base of the triangular opening faces the direction of rotation of the impeller. By referring particularly to Fig. 2, it is seen that the abrasive, carried along by the rotating throwing vanes 22, is distributed uniformly over the width thereof, and is gradually discharged from the vane and thrown through the triangular shaped opening O. In other words, the rotating vane first arrives at the apex of the triangular opening with the result that the abrasive deposited on the center portion of the vane is first thrown through the apex portion of the opening following which the abrasive on both sides of the center line of the vane is thrown through the expanding triangular shaped opening until all the abrasive carried by the vane has been discharged. The abrasive carried by the vane is discharged through the triangular shaped opening as the vane moves across the opening from the apex to the base thereof. The distance between the apex and the base of the triangular shaped opening determines the length of the path swept by the abrasive discharged from the machine. It is also seen that the abrasive passes through the triangular shaped opening in substantially uniform amounts from the initial discharge through the apex of the triangle to the base thereof. The isosceles shape of the triangular opening thus determines the uniformity as well as the density of the abrasive discharged therethrough.

Figure 2:
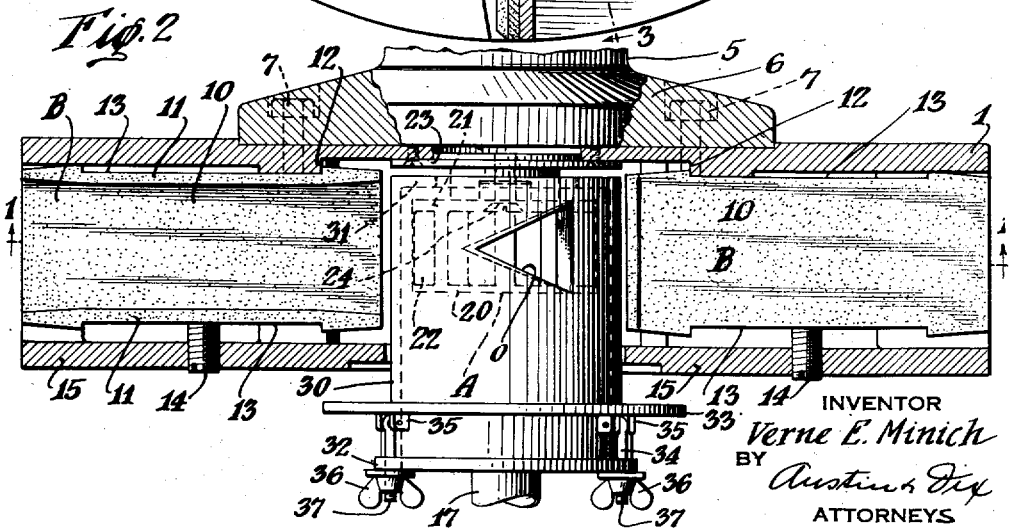
Fig. 2 is a transverse cross sectional view through the abrasive machine, this view being taken on line 2—2 of Fig. 1.
Figure 3:
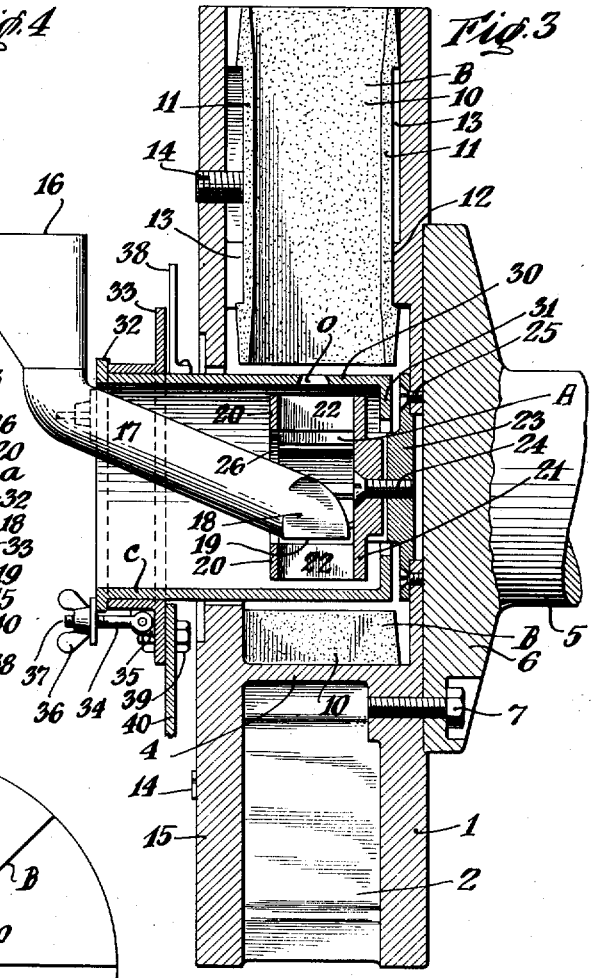
Fig. 3 is a transverse cross sectional view through the abrasive machine showing more particularly the construction of the control member and impeller, this view being taken on line 3—3 of Fig. 1.

The abrasive discharged through the opening O is impelled into the path of the moving throwing blades B. Each blade B, as shown in Figs. 1, 2 and 3, is made of heavy wear resisting material and may be mounted upon the connecting vane 2 within the abrasive discharge passage D. The blade B lies between the discs 1 and 15 and extends from the periphery of the control member C to the outer periphery of the rotor. The blade B is in the form of a chute comprising a bottom portion 10 which covers the connecting vane 2, and side wall portions 11 which protect the discs 1 and 15 from contact with the flying abrasive. Any convenient means for removably securing the blades in position may be provided. For purposes of illustration, one form of blade securing means is shown which comprises a shoulder 12 projecting from the disc 1 and which seats within a groove 13 cut in the side wall 11 of the blade B. A set screw 14 extends through the disc member 15 and engages the side portion 11 to lock the blade in position. Other well known means for removably securing the blade in position, however, may be provided within the scope of this invention. The inner end of the blade is positioned adjacent to the tubular side wall 30 of the control member. The inner end portion 41 of the side wall portions 11 are beveled and the underside of the bottom portion 10 is also beveled, as shown in Fig. 1, to reduce the end of the blade to substantially a fine edge which cleaves the abrasive ejected from the discharge opening and directs the same across the blades and prevents rebound and scattering of the abrasive. The blade is preferably flared toward the inner end thereof so as to more readily catch the abrasive emitted from the discharge opening O.

Figure 6:
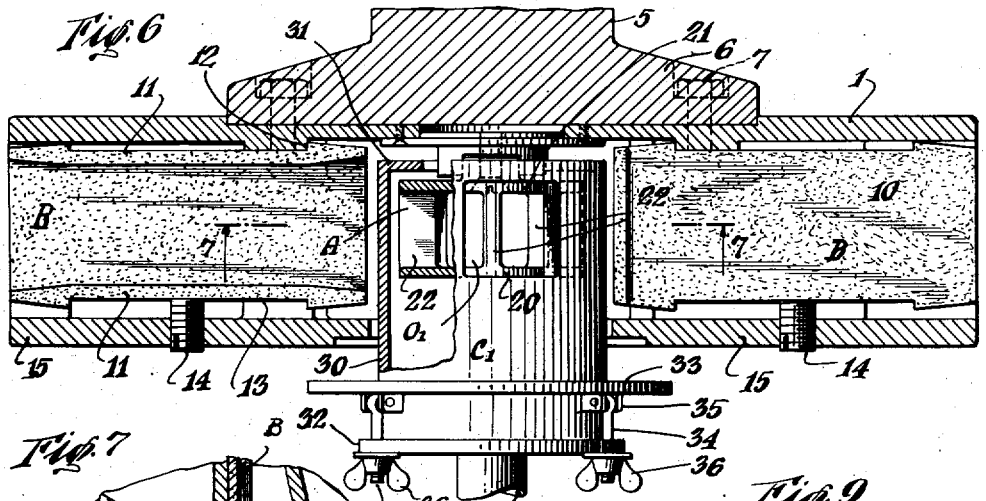
Fig. 6 is a transverse cross sectional view through the abrasive machine equipped with a control member provided with two discharge openings operative to throw abrasive on separated surfaces.
Figure 7:
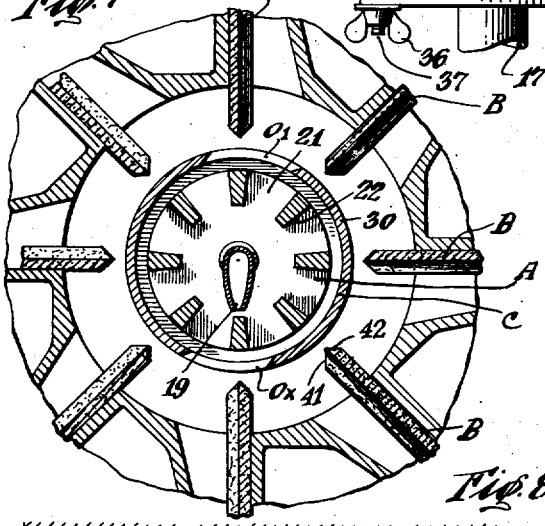
Fig. 7 is a fragmentary longitudinal cross sectional view through the abrasive machine shown in Fig. 7, this view being taken on line 7—7 of Fig. 6.
Figure 8:
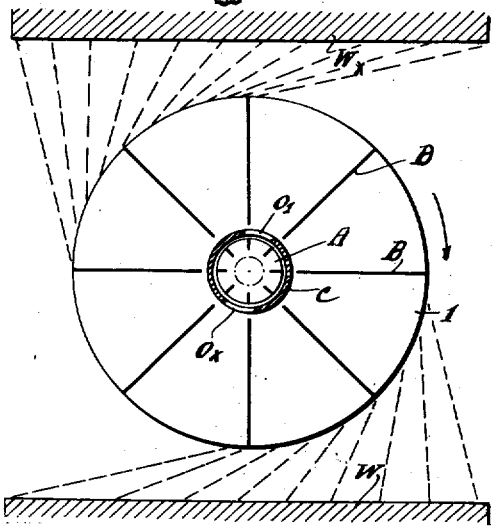
Fig. 8 is a diagrammatic view illustrating the direction of movement of the abrasive throw from the machine shown in Figures 7 and 8 when the discharge openings in the control member are positioned as shown.

Two separated surfaces may be cleaned simultaneously by providing two or more discharge openings in the control member. As shown more particularly in Figs. 7, 8 and 9, the control chamber $C_1$ is provided with a discharge opening $O_1$ and a discharge opening $O_x$ positioned approximately 180° from the opening first mentioned. With this arrangement the abrasive emitted from the discharge opening $O_1$ is thrown by the throwing blades B to impinge the work surface W positioned beneath the machine, and the abrasive emitted from the discharge opening $O_x$ is thrown by the blades B so as to impinge the work $W_x$ positioned above the machine. Two separated surfaces can thus be cleaned simultaneously by means of a single wheel. It will be understood that any number of work surfaces arranged at any angle to one another can be cleaned by means of a single wheel by providing a control member having an opening for each work surface, each opening being so arranged as to discharge the abrasive at a point where it will eventually impinge the desired surface. Wheels having two or more discharge openings in the control member may be advantageously used in the cleaning of tubes, boilers, metal sheets, forgings, castings, billets and other metallic objects having two or more surfaces to be cleaned. The discharge opening $O_1$ shown in Fig. 6 is rectangular in form. A control member having rectangular openings of this type is especially adapted to throw relatively large concentrated quantities of abrasive over a relatively small area.

Figure 9:
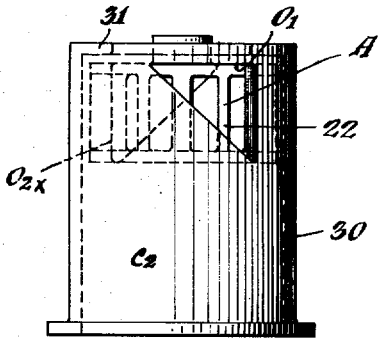
Fig. 9 is a side view of a control member having discharge openings in the shape of right angled triangles.

A control member $C_2$ is shown in Fig. 9 having discharge openings $O_2$ and $O_{2x}$ in the shape of right angled triangles, the base of which is axially arranged. The circumferential length of the right angled triangular discharge opening determines the length of the path swept by the abrasive. The rotating throwing blades 22 of the impeller first discharge the abrasive at the apex of the triangle, and, as the blades progress across the discharge opening, the abrasive is emitted in a uniform quantity through the discharge opening until the base of the triangular discharge opening is reached. The control member $C_3$ may be provided with one, two or more discharge openings depending upon the number of surfaces to be reached by the abrasive.

Figure 10:
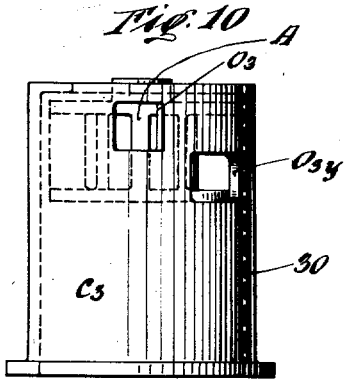
Fig. 10 is a side view of a control member having discharge openings laterally offset with respect to one another.

There is shown in Fig. 10 a control chamber $C_4$ having a discharge outlet comprising spaced openings $O_3$ and $O_{3y}$ arranged in series. These openings may be either rectangular or triangular in shape. If two discharge openings are used the width of each discharge opening $O_3$ and $O_{3y}$ is approximately half the axial width of the impeller A. Considering the impeller as rotating clockwise, the abrasive is first discharged through the opening $O_3$. The openings $O_3$ and $O_{3y}$ are preferably arranged so that there is no break in the uniformity of discharge. A path of considerable length can be cleaned by the provision of two or more rectangular discharge openings, each covering only a part of the actual width of the impeller, the openings being offset with respect to one another. There should be a break between the two openings approximately equal to the length of each opening since the abrasive flowing out of the first opening spreads fanwise and sufficient interval must be allowed between the openings so that the fans will not overlap if the greatest surface coverage by the abrasive is to be realized. The offset arrangement of the openings as shown in Fig. 10 has produced very advantageous results with respect to uniformity of discharge and a long path across the work is swept by the abrasive.

Figure 11:
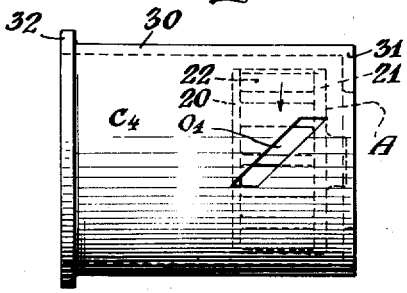
Fig. 11 is a side view of a control member having a slot shaped discharge opening extending diagonally across the side wall of the member.

There is shown in Fig. 11 a control member $C_4$ having a biased slot shaped opening $O_4$. The opening $O_4$ is cut at an angle across the tubular side wall 30 of the control member and extends the full width of the impeller throwing vanes 22. When a discharge opening $O_4$, as shown in Fig. 11, is used, it is seen that the abrasive is discharged substantially uniformly through the openings as the impeller throwing vanes 22 move across the same.

In all cases the axial width of each discharge opening of plural discharge openings should be of sufficient width to extend completely over the side walls of 20 and 21 of the impeller. By making the discharge opening equal to or larger than the width of the impeller A the circumferential side margins of the opening are spared the wear which otherwise results when the abrasive thrown by the impeller is thwarted in its exit by the overhanging portions along the circumferential sides of the opening. The axial width of the opening should, however, be not more, and preferably less, than the width of the blades B so that all the abrasive is guided directly into the path of the blades B and out of contact with the permanent parts 1 and 15 of the machine.

It is understood that a variety of different shaped discharge openings may be used within the contemplation of this invention depending upon the effects to be produced. As a general principle, the opening or arrangement of openings should extend on a bias with respect to the impeller throwing vanes 22. The circumferential length of the opening generally determines the length of the path swept by the abrasive and the axial shape and width of the slot determines the concentration intensity and impingement uniformity of the abrasive thrown from the wheel.

Figure 5:
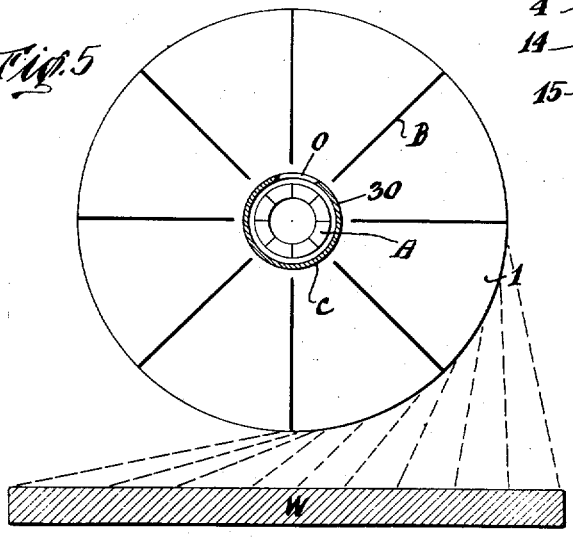
Fig. 5 is a diagrammatic view illustrating the direction of movement of the abrasive thrown from the machine when the discharge opening in the adjustable control member is positioned as shown.

The abrasive ejected from the discharge opening O, $O_1$, $O_2$, $O_3$, $O_4$ or modifications thereof is carried by the rotor and thrown or projected by the throwing blades B. As diagrammatically illustrated in Fig. 5, the abrasive which is first ejected from the dischargre opening is carried by the throwing blades B a distance of approximately 120 to 180° before leaving the outer ends of the blades to impinge the work W. The abrasive which is last to leave the discharge opening O likewise leaves the ends of the blades B at a point approximately 120 to 180° removed from the extreme edge of the discharge opening. The range of discharge, of course, depends to a considerable degree upon the length of the discharge passage through which the abrasive has to move after being emitted from the discharge opening in the control member. The direction of discharge may also vary with the length of the discharge passage D, as well as the diameter of the control member and general tip blade diameter of the wheel. A wheel having a diameter of approximately 19½ inches and a control member of approximately 5 inches will throw the abrasive approximately as shown in Fig. 5 when rotated at an abrading speed of 2250 R. P. M. With a triangular shaped discharge opening having a peripheral length of approximately 2½ inches, an effective cleaning path of from 2 to 3 feet will be swept by the abrasive. Different operating effects may be obtained by changing either the shape or size of the discharge opening in the control member. Change in shape and size of the discharge opening can be effected by either providing adjustable shutters for the opening or by the provision of a removable and replaceable control member having the desired type of discharge opening.

With a machine as above constructed substantially all of the abrasive can be thrown in the direction desired so as to directly impinge the desired work area and perform effective work. The removable and replaceable throwing blades are so constructed that none of the abrasive emitted from the discharge opening is permitted to contact the discs 1 and 15 or other permanent parts of the machine. The blades B are made of wear resisting material and will withstand great abuse. When furrowed or otherwise worn by the moving abrasive they may be easily and quickly removed and replaced with new shoes.

The machine is adapted for a variety of different uses, such as the cleaning of metal sheets, billets, castings, forgings and other articles. The machine may be mounted upon any suitable standard or may be associated with other apparatus, such as a tumbling mill. The machine is made of few parts, and may be inexpensively manufactured and assembled. Adjustable means are provided which may be easily and quickly manipulated to directionally control the thrown abrasive as well as to limit or expand the path swept by the abrasive and the intensity of the impingement against the work. The machine is furthermore strong and durable in construction, substantially foolproof in operation, requires little floor space and is highly efficient.

While certain novel features of the invention have been disclosed and are pointed out in the annexed claims, it will be understood that various omissions, substitutions and changes may be made by those skilled in the art without departing from the spirit of the invention.

What is claimed is:

1. A machine for throwing abrasive including in combination, a tubular control member having a discharge outlet in the tubular side wall thereof, and throwing blades radially arranged around said member operative to throw the abrasive emitted from said outlet, said discharge outlet having one or more edge portions extending progressively axially and circumferentially across said tubular side wall.

2. A machine for throwing abrasive including in combination, a tubular control member having a discharge outlet in the tubular side wall thereof, impelling means interiorly of said control member for progressively ejecting abrasive through said discharge outlet and throwing blades radially arranged around said member operative to throw the abrasive emitted from said outlet, said outlet extending diagonally across the side wall of said member thereby effecting substantially uniform concentration of the abrasive throughout the predetermined path swept by the abrasive thrown from the machine.

3. A wheel for throwing abrasive including in combination, an adjustably mounted tubular control member having an outlet in the tubular side wall thereof, impelling means interiorly of said control member for progressively ejecting abrasive through said discharge outlet and rotatably mounted throwing blades radially arranged around said member operative to throw the abrasive emitted from said outlet, said outlet being diagonally arranged with respect to said impelling means thereby effecting substantially uniform concentration of the abrasive throughout the predetermined path swept by the abrasive thrown from the wheel.

4. A machine for throwing abrasive including in combination, a tubular control member having a triangular shaped discharge opening extending circumferentially across the tubular side wall thereof, and throwing blades radially arranged around said member operative to hurl the abrasive emitted from said opening at blasting velocities.

5. A machine for throwing abrasive including in combination, a tubular control member having an elongated discharge opening extending obliquely across a circumferential portion of said member, and throwing blades radially arranged around said member operative to throw abrasive emitted from said opening.

6. A machine for throwing abrasive at blasting velocities including, a tubular control member having a discharge opening extending diagonally across the tubular side wall thereof, and throwing blades radially arranged around said member operative to throw the abrasive emitted from said opening, said discharge opening having an axial width less than the width of said throwing blades.

7. A machine for throwing abrasive including in combination, a tubular control member having a triangular shaped discharge opening extending circumferentially across the tubular side wall thereof, and throwing blades radially arranged around said member operative to hurl the abrasive emitted from said opening at blasting velocities, said discharge opening having an axial width less than the width of said throwing blades.

8. A machine for throwing abrasive at blasting velocities including, a tubular control member having one or more discharge openings in the tubular side wall thereof, impelling means interiorly of said control member for progressively ejecting abrasive through said discharge outlet and throwing blades radially arranged around said member operative to throw the abrasive emitted from said openings, said openings each having a side edge thereof extending diagonally across the side wall of said member to effect substantially uniform distribution of the abrasive over the work surface.

9. A machine for throwing abrasive at blasting velocities including, a tubular control member having a discharge opening in the form of an isosceles triangle extending circumferentially across the tubular side wall thereof, and throwing blades radially arranged around said member operative to hurl the abrasive emitted from said opening at blasting velocities.

10. A machine for throwing abrasive at blasting velocities including, a tubular control member having a discharge opening in the form of a right angled triangle with the hypotenuse thereof extending circumferentially across the tubular side wall of said member and throwing blades radially arranged around said member operative to hurl the abrasive emitted from said opening at blasting velocities.

11. A wheel for throwing abrasive at blasting velocities including, an adjustably mounted abrasive control member having a discharge outlet in the tubular side wall thereof, rotatably mounted blades radially arranged around said member, and an impeller comprising radially arranged blades rotatably mounted within said member operative to throw the abrasive through the outlet and into the path of said rotating blades, said discharge outlet and impeller blades being diagonally arranged with respect to one another so that the abrasive is swept across different edge portions of the outlet as the impeller blades progressively move across the same so as to thereby effect substantially uniform distribution of the abrasive over the work surface.

12. A wheel for throwing abrasive at blasting velocities comprising, throwing blades extending from the periphery of a wheel substantially to the circumference of a normally stationary, centrally disposed, tubular control member having an abrasive discharge outlet in the tubular wall thereof, and movable abrasive ejecting means positioned interiorly of said tubular control member, the discharge outlet in said tubular control member being so shaped and arranged as to effect the gradual discharge of abrasive at a substantially uniform rate to the inner end of each throwing blade as the same travels a single time through a predetermined limited arc of the circumference of said stationary control member, whereby each throwing blade is caused to gradually receive at its inner end each charge of abrasive and to discharge from the periphery of the wheel a substantially uniform stream of substantially uniform volume over a predetermined area.

13. In an abrading machine, a rotor having a plurality of blades terminating short of the axis of said rotor to define an abrasive admitting space, an abrasive feeding device of an external diameter less than the radius of the rotor extending into said space and having a discharge opening therein disposed to one side of the axis of said rotor and located between the planes of rotation defined by the sides of said blades for delivering abrasive to the inner ends of said blades, said blades terminating sufficiently close to said feeding device to pick up the abrasive with a minimum impact and being operable to discharge it from the outer ends of said blades at an abrading velocity when said rotor is rotated, a rotatable impeller comprising a plurality of impeller vanes disposed within said feeding device, said discharge opening and impeller vanes being diagonally arranged with respect to one another so that the abrasive is swept across different edge portions of the discharge opening as the impeller vanes progressively move across the same, said vanes being joined adjacent said rotor by a generally circular flange structure, said vanes extending to a region closely adjacent the axis to define a comparatively small axially extending passage, and means for introducing abrasive into said passage and over the inner edges of said vanes, said vanes being operable to impel abrasive through said discharge opening, said impeller vanes being axially spaced from said rotor and said feeding device having an inwardly extending abrasive-retaining flange disposed between said impeller vanes and said rotor, and having an internal diameter which is less than the overall external diameter of said impeller vanes, whereby said abrasive retaining flange overhangs the side edges of said impeller vanes to provide a closed chamber within said abrasive feeding device for minimizing abrasive leakage therefrom.

14. A wheel for throwing abrasive at blasting velocities including, an adjustably mounted abrasive control member having a discharge outlet in the tubular side wall thereof, rotatably mounted blades radially arranged around said member, and an impeller comprising radially arranged blades rotatably mounted within said member operative to throw the abrasive through the outlet and into the path of said rotating blades, said discharge outlet and impeller blades being diagonally arranged with respect to one another so that the abrasive is swept across different edge portions of the outlet as the impeller blades progressively move across the same so as to thereby effect substantially uniform distribution of the abrasive over the work surface, said control member having an inwardly extending abrasive retaining flange disposed at the inner ends of said impeller blades and having an internal diameter less than the overall external diameter of said impeller vanes.

VERNE E. MINICH.